United States Patent
Kuo et al.

(10) Patent No.: US 10,900,464 B1
(45) Date of Patent: Jan. 26, 2021

(54) METHOD OF AUTOMATICALLY EXTRACTING ENERGY FROM FLOWING LIQUID AND DEVICE USING THE SAME

(71) Applicant: NATIONAL TAIWAN NORMAL UNIVERSITY, Taipei (TW)

(72) Inventors: Chin-Guo Kuo, Taipei (TW); Jung-Hsuan Chen, Taipei (TW); Chao-Fu Shu, Taipei (TW)

(73) Assignee: National Taiwan Normal University, Taipei (TW)

( * ) Notice: Subject to any disclaimer, the term of this patent is extended or adjusted under 35 U.S.C. 154(b) by 0 days.

(21) Appl. No.: 16/528,371

(22) Filed: Jul. 31, 2019

(30) Foreign Application Priority Data

Jul. 10, 2019 (TW) .............................. 108124372 A

(51) Int. Cl.
*F03B 17/06* (2006.01)

(52) U.S. Cl.
CPC ......... *F03B 17/062* (2013.01); *F05B 2210/11* (2013.01); *F05B 2240/91* (2013.01)

(58) Field of Classification Search
CPC ...... F03B 17/062; F03B 17/061; F03B 17/06; F03B 17/04; F05B 2210/11; F05B 2240/91
USPC ..................................................... 290/43, 54
See application file for complete search history.

(56) References Cited

U.S. PATENT DOCUMENTS

| | | | | |
|---|---|---|---|---|
| 705,967 A | * | 7/1902 | Roeh ........................ | B63H 1/30 416/83 |
| 802,228 A | * | 10/1905 | Morton .................... | B63H 1/30 416/83 |
| 804,676 A | * | 11/1905 | Roeh ........................ | B63H 1/30 416/83 |
| 905,320 A | * | 12/1908 | Isham ...................... | B63H 1/30 416/83 |
| 4,268,757 A | * | 5/1981 | Rogers .................. | F03B 17/063 290/53 |
| 5,009,571 A | * | 4/1991 | Smith ...................... | F03D 5/06 416/79 |
| 5,708,305 A | * | 1/1998 | Wolfe ................. | F03B 13/1815 290/42 |
| 5,899,664 A | * | 5/1999 | Lawrence ............... | F03B 17/06 416/197 A |
| 6,217,284 B1 | * | 4/2001 | Lawrence ............. | F03B 17/062 415/3.1 |
| 6,731,018 B1 | * | 5/2004 | Grinsted ................. | F03B 17/06 290/42 |

(Continued)

*Primary Examiner* — Charles Reid, Jr.
(74) *Attorney, Agent, or Firm* — Muncy, Geissler, Olds & Lowe, P.C.

(57) ABSTRACT

A method of automatically extracting energy from flowing liquid and a device using the same are disclosed. The device includes a paddle rod and a swing device. The paddle rod includes two paddles to bear a pushing force of flowing liquid. When the paddle rod is swung, one of the two paddle enters water and the other paddle leaves from water surface. When the paddle in the water bears a pushing force of flowing liquid to drive a rotary body to swing, the paddle rod moves upwardly and leaves the water surface, and the other paddle enters water to bear the pushing force, and after the rotary body is driven to swing reversely, the paddle rod moves upwardly and leaves water surface, and at the same time the paddle enters the water to bear the pushing force, to drive the rotary body to swing reversely.

4 Claims, 5 Drawing Sheets

(56) References Cited

U.S. PATENT DOCUMENTS

| | | | | |
|---|---|---|---|---|
| 8,049,357 B2* | 11/2011 | Saavedra | ............. | F03B 17/062 290/54 |
| 8,206,106 B2* | 6/2012 | Syrovy | .................... | F03D 9/25 416/83 |
| 8,884,457 B1* | 11/2014 | Jones | ...................... | F03B 17/06 290/54 |
| 2006/0244267 A1* | 11/2006 | Fraenkel | ............... | F03B 13/264 290/54 |
| 2009/0224551 A1* | 9/2009 | Williams | ................. | F03D 5/06 290/55 |
| 2010/0019499 A1* | 1/2010 | Perner | ................. | F03B 13/264 290/53 |
| 2010/0327597 A1* | 12/2010 | Patel | .................... | F03B 17/063 290/54 |
| 2012/0098266 A1* | 4/2012 | Fransen | ............... | F03B 17/065 290/54 |
| 2012/0171035 A1* | 7/2012 | Fransen | ............... | F03B 17/067 416/17 |
| 2013/0113215 A1* | 5/2013 | Corcoran | ................ | F03B 13/00 290/54 |
| 2019/0331088 A1* | 10/2019 | Durham | ................. | F03B 17/06 |

* cited by examiner

METHOD OF AUTOMATICALLY EXTRACTING ENERGY FROM FLOWING LIQUID AND DEVICE USING THE SAME

This application claims priority for Taiwan patent application no. 108124372 filed on Jul. 10, 2019, the content of which is incorporated by reference in its entirely.

BACKGROUND OF THE INVENTION

1. Field of the Invention

The present invention relates to an energy extracting technology, and more particularly to a device of automatically extracting energy of flowing liquid and a method thereof.

2. Description of the Related Art

Most conventional methods of automatically extracting energy from flowing liquid is based on liquid level difference, for example, paddles of a waterwheel can capture motional energy of flowing water and convert the motional energy into mechanical energy. Because of complex paddle structures of the waterwheel, installation and maintenance of the waterwheel are inconvenient, and it is not popular to install many waterwheels along a long-distance river. Therefore, the conventional method of automatically extracting energy from flowing liquid has drawback that the amount of extracted flowing liquid is limited.

SUMMARY OF THE INVENTION

An objective of the present invention is to provide a method of automatically extracting motional energy of flowing water in a river, and a device using the method, and the device includes a paddle rod and a swing device. The paddle rod includes two paddles disposed at two ends thereof and configured to bear energy of flowing liquid, a central part of the paddle rod is fastened on a bearing holder of the swing device. During a swing operation, the paddle at an end of the paddle rod enters water, and the paddle at other end of the paddle rod leaves from water surface. A shaft of the bearing holder is fixed on a rotary body of the swing device, and the rotary body is fixed in a river by a fixed column. The paddle in the water bears a pushing force of flowing water, so as to drive the rotary body to swing to a certain torque, and the paddle rod of the paddle is then forced to move upwardly to leave from the water surface; and at the same time, the paddle at the other end of the paddle rod enters water to bear the pushing force of flowing water, so as to drive the rotary body to swing to a certain torque in a reverse direction, and the paddle rod of the paddle is also forced to move upwardly to leave water surface; and at the same time, the paddle at the end of the paddle rod enters water to bear the pushing force of flowing water, so as to drive the rotary body to swing reversely. As a result, the rotary body can automatically swing back and forth continuously, and obviously, the power for driving the rotary body to swing back and forth continuously is the energy of flowing liquid extracted by the paddles of the paddle rod.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
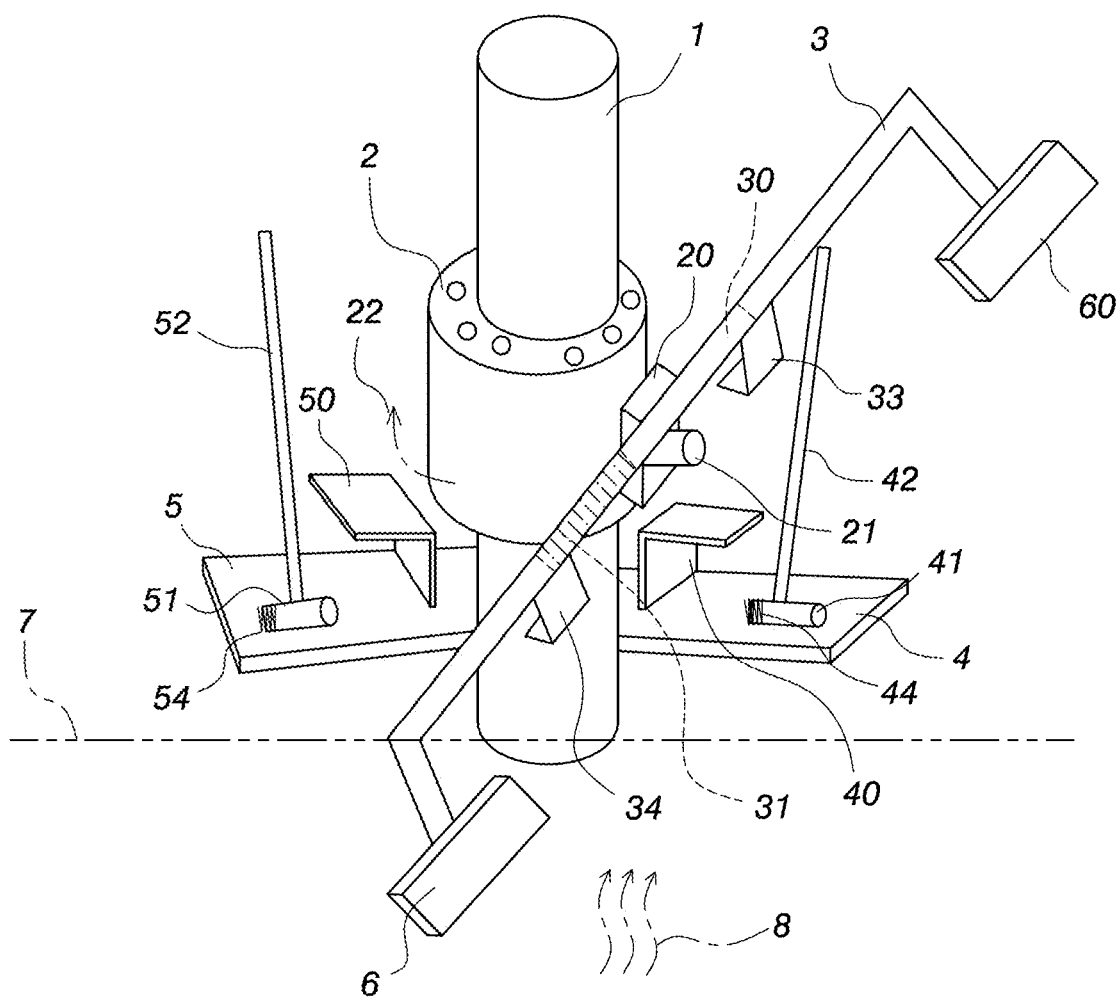
FIG. 1 is a schematic view of an operation principle of paddles of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIGS. 1 to 5, which show embodiments of a device and a method of automatically extracting energy from flowing liquid of the present invention. As shown in FIG. 1, the device of automatically extracting energy from flowing liquid includes a paddle rod 3 and a swing device. The paddle rod 3 includes paddles 6 and 60 disposed at two ends thereof, and each paddle has a certain area to bear a force of flowing liquid. A central part of the paddle rod 3 is fastened on a bearing holder 20 of the swing device, a middle section of the paddle rod 3 is a hollow pipe 30, and a certain amount of water is filled inside the hollow pipe 30. An outer edge of the paddle rod 3 is connected to two blocking plates 33 and 34 which are in long L shapes and disposed at left and right sides of the paddle rod 3, respectively. The bearing holder 20 is mounted with a shaft 21 fixed on a rotary body 2 of the swing device, so that the bearing holder 20 can be supported by the shaft 21 to swing about the shaft 21 in a clockwise or counterclockwise direction. The rotary body 2 is cylindrical, and is mounted with a fixed column 1 by a ball bearing, and is swingable in a horizontal direction. The fixed column 1 is fixed in a river, and two sides of the fixed column 1 are connected to two linking plates 4 and 5, respectively. The linking plate 4 includes a restricting plate 40 and a link rod 42 disposed thereon. The restricting plate 40 is in a long L shape, and the link rod 42 is in a rod shape, and an end of the link rod 42 is connected to a rotary shaft 41. The rotary shaft 41 includes a retractile spring 44 disposed in the inside thereof and connected to the link rod 42, so as to form a function of storing rotation power. The link rod 42 can be swung downwardly subject to a pushing force, and the swing action of the link rod 42 can drive the rotary shaft 41 to rotate and compress the retractile spring 44, and when the pushing force disappears, the retractile spring 44 elastically restores to force the link rod 42 to swing upwardly. The linking plate 5 comprises a restricting plate 50 and a link rod 52 disposed thereon. The restricting plate 50 is in a long L shape, and the link rod 52 is in a rod shape. An end of the link rod 52 is connected to the rotary shaft 51, and the combination of the rotary shaft 51 and the retractile spring 54 can form the function of storing rotation power. The link rod 52 can be swung downwardly subject to a pushing force, and the swing action of the link rod 52 can drive the rotary shaft 51 to rotate and compress the retractile spring 54, and when the pushing force disappears, the retractile spring 54 elastically restores to force the link rod 52 to swing upwardly.

Figure 2:
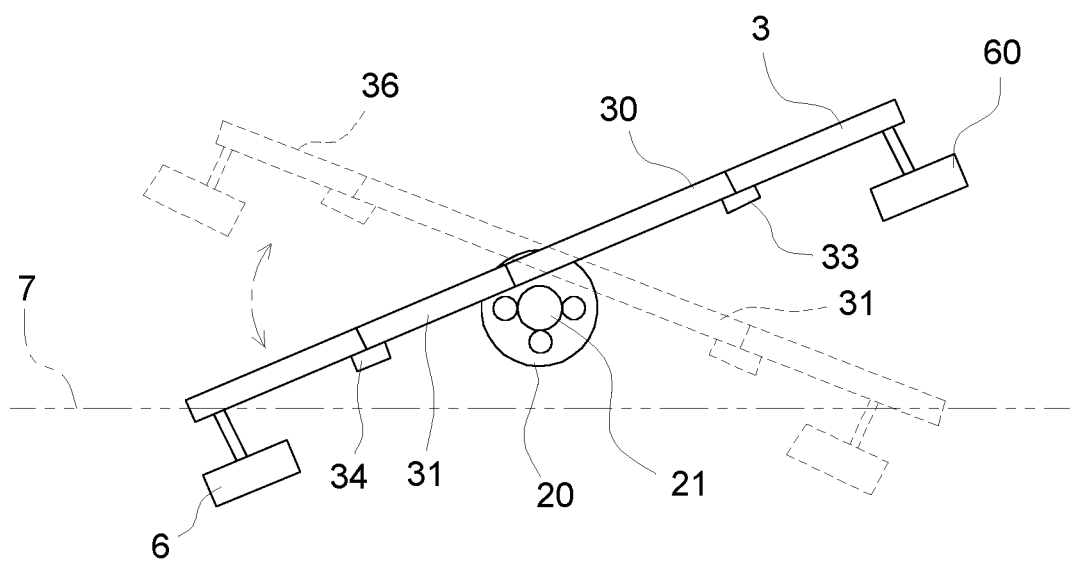
FIG. 2 is an elevational view of a swing operation of paddles of the present invention.

When the paddle 6 is immersed under a liquid surface 7, the paddle 6 bears a pushing force of flowing liquid in a flowing liquid direction 8, and the pushing force can actuate the paddle rod 3 to rotate the rotary body 2 clockwise, such as in a direction 22 shown in FIG. 1. The swing operation of the paddle rod 3 is shown in FIG. 2. When the paddle rod 3 tilts to make the paddle 6 immerse under the liquid surface 7, the paddle 60 leaves the liquid surface 7 and water 31 inside the hollow pipe 30 is moved to the side of the hollow pipe 30 close to the paddle 6, so that a gravity center of the paddle rod 3 is moved close to the paddle 6, and the paddle 6 keeps staying in the flowing liquid and continuously bears the pushing force in the flowing liquid direction 8.

Figure 3:
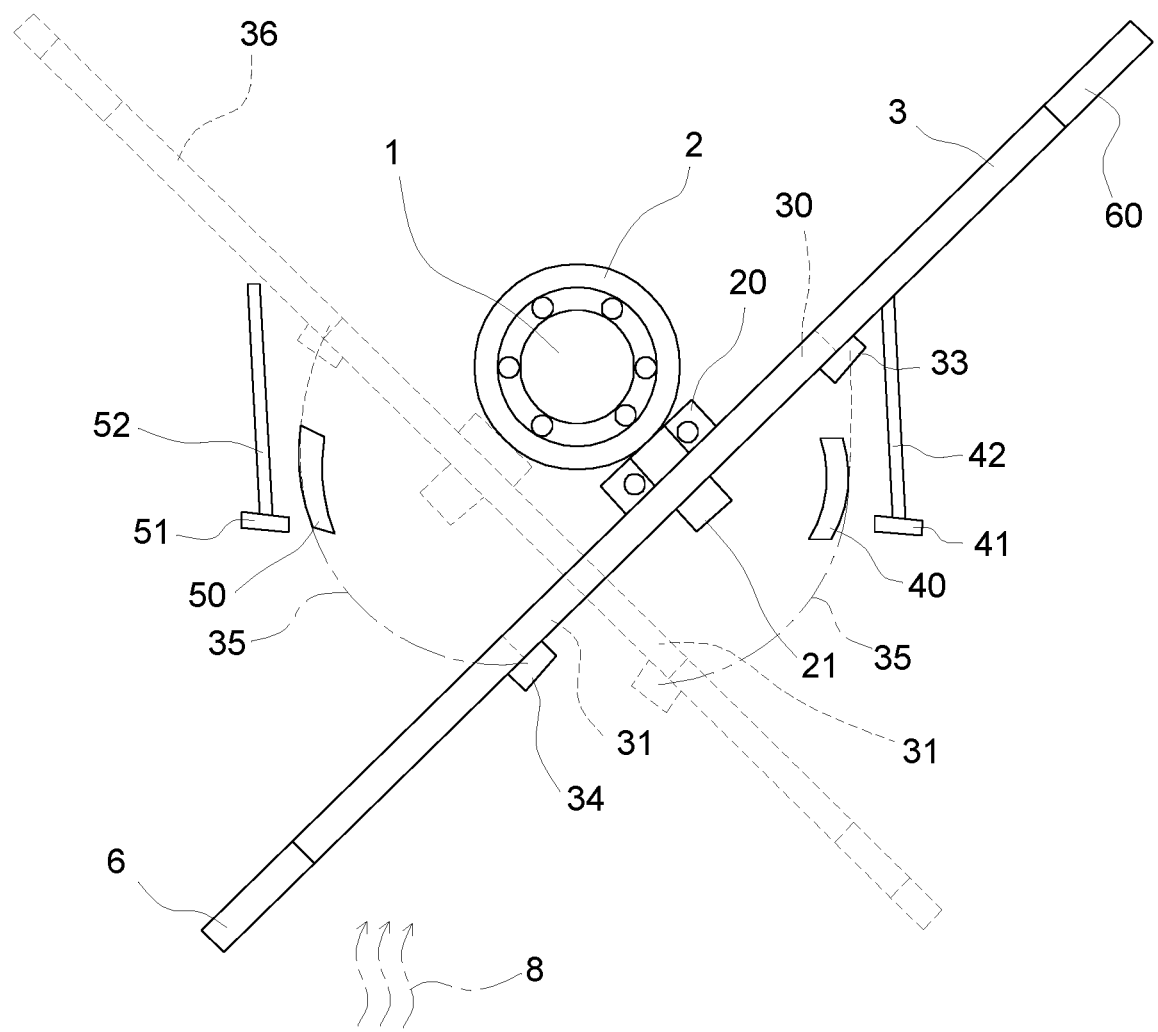
FIG. 3 is a top view of a swing operation of paddles of the present invention.

After the paddle 6 of the paddle rod 3 bears the pushing force of the flowing liquid in the flowing liquid direction 8 to move a distance, as shown in FIG. 3, the movement of the paddle rod 3 is shown as a swing interval 35, and the paddle rod 3 presses the link rod 52 to make the link rod 52 swing downwardly, so as to drive the rotary shaft 51 to rotate to compress the retractile spring 54, thereby storing motional energy; at the same time, the blocking plate 34 of the paddle rod 3 just enters a lower part of the restricting plate 50, so that the paddle rod 3 still tilts to make the paddle 6 stay under the liquid surface 7 to bear the pushing force in the flowing liquid direction 8.

Figure 4:
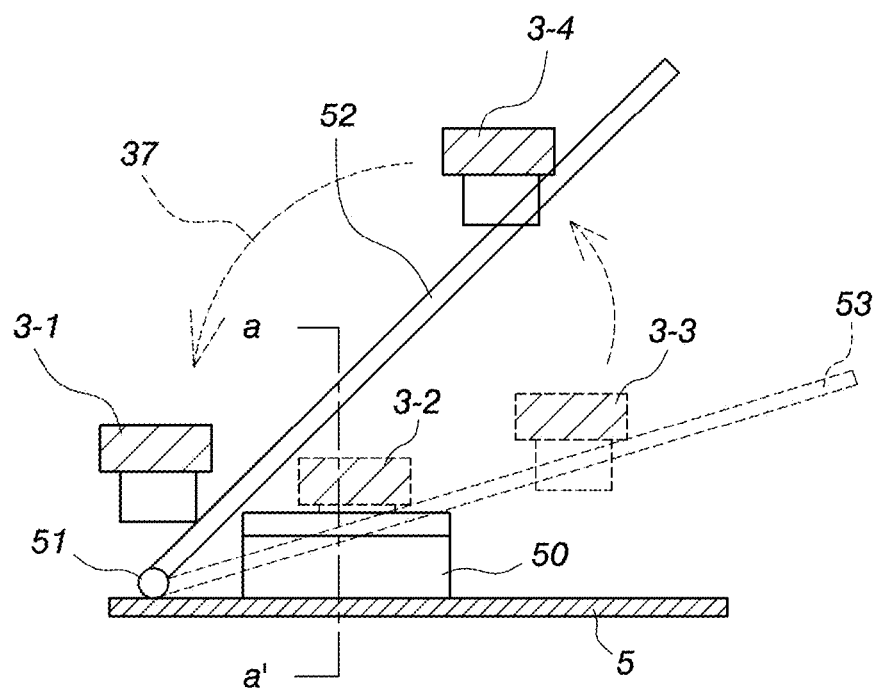
FIG. 4 is a sectional view of an operation of controlling a paddle rod to move upwardly according to the present invention.
Figure 4:
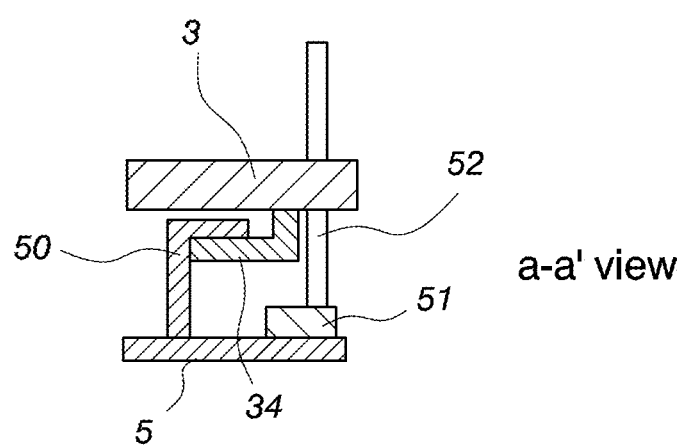

Please refer to FIG. 4, which shows states of the blocking plate 34 of the paddle rod 3 passing through the restricting plate 50. As shown in FIG. 4, a state 3-1 shows the state before the blocking plate 34 enters the restricting plate 50, a state 3-2 shows the state while the blocking plate 34 is entering the restricting plate 50, and a state 3-3 shows the state while the blocking plate 34 is leaving from the restricting plate 50, and a state 3-4 shows the state when the blocking plate 34 leaves from the paddle rod 3 already and the paddle rod 3 moves upwardly, and the state of the blocking plate 34 is then back to the state 3-1 along the path 37, and the above-mentioned operational cycle is repeated continuously. The sectional view taken along a line a-a' shows that in the state 3-2 the blocking plate 34 of the paddle rod 3 is restricted by the restricting plate 50 and unable to swing upwardly, and at the same time, the paddle rod 3 also forces the link rod 52 to swing downwardly to store motional energy, such as a state 53 shown in FIG. 3. In the state 3-3, the paddle rod 3 is not restricted by the restricting plate 50, so the paddle rod 3 can be pushed to move upwardly by the motional energy stored in the link rod 52, as shown in the state 3-4, and in this case, the paddle rod 3 tilts to make the paddle 60 immerse under the liquid surface 7 and make the paddle 6 leave the liquid surface 7, so that the water 31 inside the hollow pipe 30 is moved to the side of the hollow pipe 30 close to the paddle 60, and the gravity center of the paddle rod 3 is moved close to the paddle 60, and it makes the paddle 60 stay in flowing liquid, such as in a state 36 shown in FIG. 2.

Figure 5:
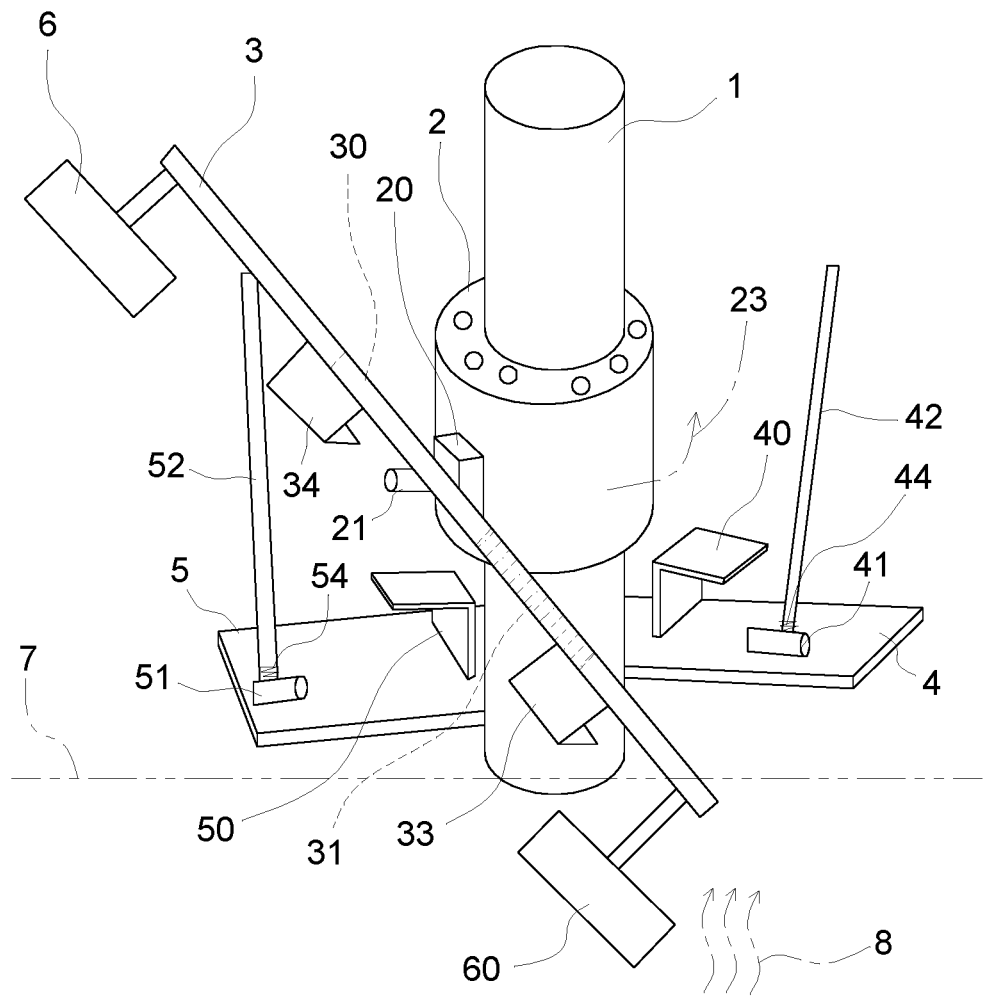
FIG. 5 is another schematic view of an operation principle of paddles of the present invention.

As shown in FIG. 5, when the paddle 60 of the paddle rod 3 is immersed under the liquid surface 7, the paddle 60 bears the pushing force of flowing liquid in the flowing liquid direction 8, and the pushing force can actuate the paddle rod 3 to rotate the rotary body 2 counterclockwise, such as in a direction 23 shown in FIG. 5. In this case, the paddle 60 of the paddle rod 3 bears the pushing force of flowing liquid in the flowing liquid direction 8 to move a distance, such as the swing interval 35 shown in FIG. 3, and the paddle rod 3 presses the link rod 42 to make the link rod 42 swing downwardly, so as to drive the rotary shaft 41 to rotate to compress the retractile spring 44, thereby storing motional energy; at the same time, the blocking plate 33 of the paddle rod 3 just enters the lower part of the restricting plate 40, so that the paddle rod 3 can still tilt to make the paddle 60 stay under the liquid surface 7 to bear the pushing force in the flowing liquid direction 8. After the blocking plate 33 of the paddle rod 3 leaves from the restricting plate 40 and is not restricted by the restricting plate 40, the paddle rod 3 can be pushed to move upwardly by the motional energy stored in the link rod 42, and at the same time, the paddle rod 3 tilts to make the paddle 6 immerse under the liquid surface 7 and make the paddle 60 leave the liquid surface 7, so that the water 31 inside the hollow pipe 30 is moved to the side of the hollow pipe 30 close to the paddle 6, and the gravity center of the paddle rod 3 is moved close to the paddle 6, thereby making the paddle 6 stay in the flowing liquid; as a result, the paddle 6 bears the pushing force of flowing liquid in the flowing liquid direction 8, so as to rotate the rotary body 2 clockwise again.

Obviously, the paddle 6 and the paddle 60 of the paddle rod 3 can alternatively bear the pushing force of flowing liquid in the flowing liquid direction 8, so as to make the rotary body 2 alternatively rotate in clockwise and counterclockwise directions. The rotation energy of the rotary body 2 is the energy of flowing liquid in the flowing liquid direction 8. As a result, the device and method of the present invention can achieve the purpose of automatically extracting energy from flowing liquid.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A device of automatically extracting energy from flowing liquid, wherein the device is disposed in the flowing liquid to extract energy of the flowing liquid, and the device comprises:
   a swing device comprising a fixed column fixed in the flowing liquid, and a rotary body disposed thereon and configured to rotate reciprocatingly relative to the fixed column, wherein the rotary body comprises a bearing holder disposed thereon and mounted with a shaft;
   a paddle rod having a central point disposed on the bearing holder, wherein the paddle rod is swingable relative to the shaft of the swing device, and the paddle rod comprises two paddles disposed on two ends thereof, respectively, and one of the two paddles is located in the flowing liquid to receive energy of the flowing liquid, for driving the rotary body to rotate; and
   two linking plates disposed on the other side of the fixed column opposite to the paddle rod, each of the two linking plates comprise a link rod disposed thereon and having an end connected to a rotary shaft, wherein the rotary shaft comprise a retractile spring disposed in the inside thereof and connected to the link rod;
   wherein when one of the two link rods contacts the end of the paddle rod pushed by a pushing force of the flowing liquid, the paddle rod is pushed back to make the rotary body rotate reversely, and at the same time, the other end of the paddle rod is immersed into the flowing liquid to contact the other of the two link rods, to drive the rotary body to reversely rotate again, thereby making the rotary body rotate reciprocatingly;
   wherein the paddle rod comprises two blocking plates disposed on two ends of a central part thereof, respectively, and between the two paddles;
   wherein each of the two linking plates comprises a restricting plate disposed thereon, and when the end of the paddle rod pushed by the flowing liquid is moved close to the one of two restricting plates, the blocking plate is engaged in the one of the two restricting plates, and at the same time the paddle rod presses the link rod until the blocking plate leaves from the one of the restricting plates, and the link rod then reversely pushes up the paddle rod, to make the rotary body rotate reversely and make the other end of the paddle rod immerse into the flowing liquid at the same time;
   wherein a middle section of the paddle rod is a hollow pipe, and a certain amount of water is filled inside the hollow pipe.

2. The device according to claim 1, wherein each of the two blocking plates is a L-shaped blocking plate.

3. The device according to claim 1, wherein each of the two restricting plates is a L-shaped restricting plate.

4. The device according to claim 1, wherein the rotary body is a cylindrical rotary body.

* * * * *